United States Patent
McKenney

(10) Patent No.: US 10,831,542 B2
(45) Date of Patent: *Nov. 10, 2020

(54) PREVENT COUNTER WRAP DURING UPDATE-SIDE GRACE-PERIOD-REQUEST PROCESSING IN TREE-SRCU IMPLEMENTATIONS

(71) Applicant: International Business Machines Corporation, Armonk, NY (US)

(72) Inventor: Paul E. McKenney, Beaverton, OR (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 94 days.

This patent is subject to a terminal disclaimer.

(21) Appl. No.: 16/148,678

(22) Filed: Oct. 1, 2018

(65) Prior Publication Data

US 2020/0104176 A1  Apr. 2, 2020

(51) Int. Cl.
*G06F 9/50* (2006.01)
*G06F 3/06* (2006.01)
*G06F 12/0802* (2016.01)

(52) U.S. Cl.
CPC .......... *G06F 9/5027* (2013.01); *G06F 3/0608* (2013.01); *G06F 3/0646* (2013.01);
(Continued)

(58) Field of Classification Search
CPC ... G06F 9/5027; G06F 9/30087; G06F 9/3836
See application file for complete search history.

(56) References Cited

U.S. PATENT DOCUMENTS

| | | | |
|---|---|---|---|
| 5,442,758 | A | 8/1995 | Slingwine et al. |
| 5,608,893 | A | 4/1997 | Slingwine et al. |
| 5,727,209 | A | 3/1998 | Slingwine et al. |
| 6,219,690 | B1 | 4/2001 | Slingwine et al. |
| 6,662,184 | B1 | 12/2003 | Friedberg |
| 6,886,162 | B1 | 4/2005 | McKenney |

(Continued)

OTHER PUBLICATIONS

McKenney et al ;Sleepable Read-Copy Update mechanism for mutual exclusion;18 pages (Year: 2006).*

(Continued)

*Primary Examiner* — Wei Y Zhen
*Assistant Examiner* — Brahim Bourzik
(74) *Attorney, Agent, or Firm* — Noah Sharkan, Esq.; Kevin P. Radigan, Esq.; Heslin Rothenberg Farley & Mesiti P.C.

(57) ABSTRACT

In an SRCU environment, per-processor data structures each maintain a list of SRCU callbacks enqueued by SRCU updaters. An SRCU management data structure maintains a current-grace-period counter that tracks a current SRCU grace period, and a future-grace-period counter that tracks a farthest-in-the-future SRCU grace period needed by the SRCU callbacks enqueued by the SRCU updaters. A combining tree is used to mediate a plurality of grace-period-start requests concurrently vying for an opportunity to update the future-grace-period record on behalf of SRCU callbacks. The current-grace-period counter is prevented from wrapping during some or all of the grace-period-start request processing. In an embodiment, the counter wrapping is prevented by performing some or all of the grace-period start-request processing within an SRCU read-side critical section.

20 Claims, 6 Drawing Sheets

(52) U.S. Cl.
    CPC ........ *G06F 3/0673* (2013.01); *G06F 12/0802*
              (2013.01); *G06F 2212/62* (2013.01)

(56) References Cited

U.S. PATENT DOCUMENTS

| | | | |
|---|---|---|---|
| 6,996,812 | B2 | 2/2006 | McKenney |
| 7,191,272 | B2 | 3/2007 | McKenney |
| 7,287,135 | B2 | 10/2007 | McKenney et al. |
| 7,353,346 | B2 | 4/2008 | McKenney et al. |
| 7,349,879 | B2 | 6/2008 | McKenney et al. |
| 7,395,263 | B2 | 7/2008 | McKenney |
| 7,395,383 | B2 | 7/2008 | McKenney |
| 7,426,511 | B2 | 9/2008 | McKenney |
| 7,454,581 | B2 | 11/2008 | McKenney et al. |
| 7,472,228 | B2 | 12/2008 | McKenney et al. |
| 7,653,791 | B2 | 1/2010 | McKenney |
| 7,689,789 | B2 | 3/2010 | McKenney et al. |
| 7,734,879 | B2 | 6/2010 | McKenney et al. |
| 7,734,881 | B2 | 6/2010 | McKenney et al. |
| 7,747,805 | B2 | 6/2010 | McKenney |
| 7,814,082 | B2 | 10/2010 | McKenney |
| 7,818,306 | B2 | 10/2010 | McKenney et al. |
| 7,904,436 | B2 | 3/2011 | McKenney |
| 7,953,708 | B2 | 5/2011 | McKenney et al. |
| 7,953,778 | B2 | 5/2011 | McKenney et al. |
| 8,020,160 | B2 | 9/2011 | McKenney |
| 8,055,860 | B2 | 11/2011 | McKenney et al. |
| 8,055,918 | B2 | 11/2011 | McKenney et al. |
| 8,108,696 | B2 | 1/2012 | Triplett |
| 8,126,843 | B2 | 2/2012 | McKenney et al. |
| 8,176,489 | B2 | 5/2012 | Bauer et al. |
| 8,185,704 | B2 | 5/2012 | McKenney et al. |
| 8,195,893 | B2 | 6/2012 | Triplett |
| 8,407,503 | B2 | 3/2013 | McKenney |
| 8,495,641 | B2 | 7/2013 | McKenney |
| 8,615,771 | B2 | 12/2013 | McKenney |
| 8,706,706 | B2 | 4/2014 | McKenney |
| 8,874,535 | B2 | 10/2014 | McKenney |
| 8,924,655 | B2 | 12/2014 | McKenney |
| 8,938,631 | B2 | 1/2015 | McKenney |
| 8,972,801 | B2 | 3/2015 | McKenney |
| 9,003,420 | B2 | 4/2015 | McKenney |
| 9,189,413 | B2 | 11/2015 | McKenney |
| 9,250,978 | B2 | 2/2016 | McKenney |
| 9,256,476 | B2 | 2/2016 | McKenney |
| 9,348,765 | B2 | 5/2016 | McKenney |
| 9,396,226 | B2 | 6/2016 | McKenney |
| 9,389,925 | B2 | 7/2016 | McKenney |
| 9,519,307 | B2 | 12/2016 | McKenney |
| 9,552,236 | B2 | 1/2017 | McKenney |
| 9,720,836 | B2 | 8/2017 | McKenney |
| 9,886,329 | B2 | 2/2018 | McKenney |
| 9,965,432 | B2 | 5/2018 | McKenney |
| 2008/0082532 | A1 | 4/2008 | McKenney |
| 2013/0061071 | A1 | 3/2013 | McKenney |
| 2013/0311995 | A1* | 11/2013 | McKenney ............ G06F 9/524 718/102 |
| 2014/0089939 | A1* | 3/2014 | McKenney ............ G06F 9/524 718/107 |
| 2014/0223119 | A1* | 8/2014 | McKenney ............ G06F 12/16 711/162 |
| 2015/0153817 | A1* | 6/2015 | McKenney ........... G06F 9/5094 713/323 |
| 2018/0046468 | A1 | 2/2018 | McKenney |
| 2018/0060086 | A1 | 3/2018 | McKenney |
| 2018/0095666 | A1 | 4/2018 | McKenney |
| 2018/0165125 | A1 | 6/2018 | McKenney |
| 2018/0267840 | A1 | 9/2018 | McKenney |

OTHER PUBLICATIONS

"Matveev et al";"read-log-update A Lightweight Synchronization Mechanism for Concurrent Programming";"Nov. 4, 2015";"16 pages" (Year: 2015).*

"Prasad et al";"A Frugal Approach to Reduce RCU Grace Period Overhead";"Apr. 26, 2018";"15 pages"; (Year: 2018).*

P. McKenney et al., "Read-Copy Update: Using Execution History to Solve Concurrency Problems," PDCS, Oct. 1998, 11 pages.

P. McKenney et al., "Read-Copy Update," 2001 Ottawa Linux symposium, Jul. 2001, 22 pages.

H. Lindar et al., "Scalability of the Directory Entry Cache," 2002 Ottawa Linux Symposium, Jun. 26, 2002, pp. 289-300.

P. McKenney et al.,"Read-Copy Update," 2002 Ottawa Linux Symposium, Jul. 8, 2002, 32 pages.

A. Arcangeli et al., "Using Read-Copy-Update Techniques for System V IPC in the Linux 2.5 Kernel," 2003 FREENIX, Jun. 14, 2003, 13 pages.

P. McKenney et al., "Using RCU in the Linux 25 Kernel," Linux Journal, Oct. 1, 2003, 11 pages.

P. McKenney et al., "Scaling dcache with RCU," Linux Journal, Jan. 1, 2004, 12 pages.

P. McKenney, "RCU vs. Locking Performance on Different CPUs," 2004 Linux.conf.au, 2004, 18 pages.

P. Zijlstra, "[Patch] slab: document Slab_Destroy_by_RCU", LKML.org, Nov. 13, 2008, 1 page.

D. Sarma et al., "Making RCU Safe for Deep Sub-Millisecond Response Realtime Applications," 2004 USENIX (UseLinux track) Jun. 2004, 9 pages.

P. McKenney et al., "Extending RCU for Realtime and Embedded Workloads," 2006 Ottawa Linux Symposium, Aug. 11, 2006, 15 pages.

P. McKenney, "Sleepable RCU", LWN.net, Oct. 9, 2006, 10 pages.

T. Gleixner, High Resolution Timers / Dynamic Tics—V2, LWN.net, Oct. 31, 2006, 5 pages.

P. McKenney, "RCU and Unloadable Modules", LWN.net, Jan. 14, 2007, 4 pages.

P. McKenney, "Using Promela and Spin to verify parallel algorithms", LWN.net, Aug. 1, 2007, 11 pages.

P. McKenney, "The design of preemptible read-copy-update," LWN.net, Oct. 8, 2007, 27 pages.

T. Hart et al., "Performance of memory reclamation for lockless synchronization", Journal of Parallel and Distributed Computing, Dec. 2007, pp. 1270-1285.

P. McKenney, "What is RCU, Fundamentally", LWN.net, Dec. 17, 2007, 15 pages.

P. McKenney, What is RCU? Part 2: Usage, LWN.net,Dec. 24, 2007, 15 pages.

P. McKenney, RCU part 3: the RCU API, LWN.net, Jan. 7, 2008, 7 pages.

P. McKenney, "Integrating and Validating dynticks and Preemptible RCU," LWN.net, Apr. 22, 2008, 19 pages.

D. Guniguntala et al., "The read-copy-update mechanism for supporting real-time applications on shared-memory multiprocessor systems with Linux", IBM Systems Journal vol. 47 No. 2, 2008, pp. 221-236.

P. McKenney, "Introducing Technology Into Linux", 2008 Linux Developer Symposium, China, 2008, 47 pages.

P. McKenney, "Hierarchical RCU," LWN.net, Nov. 4, 2011, 19 pages.

P. McKenney, "Using a Malicious User-Level RCU to Torture RCU-Based Algorithms", linux.conf.au, Jan. 2009, 51 pages.

M. Desnoyers, "Low-Impact Operating System Tracing", University of Montreal, PhD Thesis, Dec. 2009, 233 pages.

P. McKenney, "RCU: The Bloatwatch Edition", LWN.net, Mar. 17, 2009, 9 pages.

P. McKenney, "Expedited "big hammer" RCU grace periods", LKML.org, Jun. 25, 2009, 2 pages.

P. McKenney, "RCU cleanups and simplified preemptable RCU", LKML.org, Jul. 23, 2009, 1 page.

P. McKenney, "Deterministic Synchronization in Multicore Systems: the Role of RCU", Aug. 18, 2009, pp. 1-9.

P. McKenney, "Simplicity Through Optimization", linux.conf.au, Jan. 2010, 109 pages.

P. McKenney, "The RCU API, 2010 Edition", LWN.net, Dec. 8, 2010, 11 pages.

(56) References Cited

OTHER PUBLICATIONS

J. Triplett et al., "Resizable, Scalable, Concurrent Hash Tables via Relativistic Programming", ACM-SIGOPS Operating System Review vol. 44, Issue 3, Jul. 2010, 14 pages.
M. Desnoyers et al., "User-Level Implementations of Read-Copy Update", IEEE Transactions On Parallel And Distributed Systems, vol. x, No. y, Jul. 2009, pp. 1-14.
P. McKenney, "Making RCU Safe For Battery-Powered Devices", Embedded Linux Conference, Feb. 15, 2012, pp. 1-66.
P. McKenney, "Real-Time Response on Multicore Systems: It Is Bigger Than You Think", OSPERT '12 Workshop, Jul. 10, 2012, pp. 1-34.
P. McKenney, "Getting RCU Further Out Of The Way", 2012 Linux Plumbers Conference, Real Time Microconference, Aug. 31, 2012, 31 pages.
P. McKenney, "The new visibility of RCU processing", LWN.net, Oct. 10, 2012, 4 pages.
P. McKenney, "CPU, Hotplug, RCU, and big.LITTLE", Linaro Connect, Nov. 1, 2012, 33 pages.
P. McKenney, Bare-Metal Multicore Performance in a General-Purpose Operating System, Multicore World, Feb. 2013, 66 pages.
P. McKenney, "Simplifying RCU", LWN.net, Mar. 6, 2013.
P. McKenney, "User-space RCU", LWN.net, Nov. 13, 2013, 15 pages.
J. Corbet, "The RCU-tasks subsystem", LWN.net, Jul. 30, 2014.
P. McKenney, "The RCU API, 2014 Edition", LWN.net, Sep. 4, 2014.
P. McKenney, "What Happens When 4096 Cores All Do synchronize_rcu_expedited( )?", linux.conf.au, Geelong, Australia, Feb. 3, 2015.
L. Lian et al., "Verification of the Tree-Based Hierarchical Read-Copy Update the Linux Kernel", Cornell University Library, pp. 1-14, Oct. 11, 2016.
P. McKenney, "A Tour Through RCU's Requirements", LWN.net; 2015, 36 pages.
P. McKenney, "srcu: Parallelize callback Handling", [Patch tip/core/rcu 40/40], Apr. 12, 2017, 21 pages.
P. McKenney, "Prevent sdp->srcu_gp_seq_needed counter wrap", [tip:core/rcu], Jun. 13, 2017, 3 pages.

\* cited by examiner

PREVENT COUNTER WRAP DURING UPDATE-SIDE GRACE-PERIOD-REQUEST PROCESSING IN TREE-SRCU IMPLEMENTATIONS

BACKGROUND

1. Field

The present disclosure relates to computer systems and methods in which data resources are shared among data consumers while preserving data integrity and consistency relative to each consumer. More particularly, the disclosure concerns a mutual exclusion mechanism known as "read-copy update."

2. Description of the Prior Art

By way of background, read-copy update (also known as "RCU") is a mutual exclusion technique that implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data. The second-phase update operation typically comprises freeing a stale data element to reclaim its memory, and such operation may thus be referred to as a reclaimer. In certain RCU implementations, the second-phase update operation may comprise something else, such as changing an operational state according to the first-phase update.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state. For RCU implementations embodied in operating system kernels, a context switch, an idle loop, and user mode execution have been treated as implicit quiescent states. In modern kernel-based RCU implementations, a quiescent state is typically delineated by a kernel code path being outside an RCU read-side critical section. RCU read-side primitives such as rcu_read_lock( ) and rcu_read_unlock( ) are commonly used by the readers to denote the beginning and end of such critical sections.

In some RCU implementations, such as existing versions of the Linux® kernel, there is an RCU flavor denominated "Sleepable" RCU or "SRCU." SRCU allows readers to block or sleep during their RCU read-side critical sections. This is not allowed in classic RCU implementations because arbitrary sleeping within RCU read-side critical sections could indefinitely extend grace periods. This could result in arbitrarily large amounts of memory awaiting the end of a grace period, which could result in system hangs due to memory exhaustion.

The strategy employed by SRCU is to isolate RCU grace-period detection within separate subsystems of the operating system kernel so that memory reclamation by SRCU updaters in one subsystem is not blocked by SRCU readers in other subsystems, and visa versa. Each subsystem may have a bounded number of available memory blocks that is less than the total number of memory blocks available system-wide. Example operating system subsystems for which SRCU may be used include virtualization, memory management, file systems, block I/O, drivers, etc.

Recent versions of the Linux® kernel have adopted a hierarchical version of SRCU known as Tree-SRCU. Tree-SRCU uses a combining tree of srcu_node structures to track SRCU grace periods. When an SRCU updater changes a shared data element protected by Tree-SRCU, the updater may invoke an SRCU function named call_srcu( ) to post a callback representing a request for deferred destruction of the pre-update version of the data element following an SRCU grace period. The call_srcu( ) function references the value of a current grace period counter named srcu_gp_seq, which is maintained in a global srcu_struct structure, and calculates a future grace period s that is needed in order to safely invoke the callback. The call_srcu( ) function then checks a local per-processor future grace period counter named srcu_gp_seq_needed and compares the future grace period count value therein against s. If the values are equal, it means that this processor has previously announced its need for the future SRCU grace period represented by s, such that no further SRCU updater processing is required. On the other hand, if the comparison reveals that this processor has not previously announced its need for the future SRCU grace period represented by s, the call_srcu( ) function updates the local srcu_gp_seq_needed counter by setting it to s, then attempts to request the future grace period s using a funnel-locking technique to push a grace-period-start request up the tree of srcu_node structures.

The call_srcu( ) function initiates an srcu_node tree walk by calling one of two SRCU functions, respectively named srcu_funnel_gp_start( ) and srcu_funnel_exp_start( ), depending on whether a normal or expedited SRCU grace period is needed. Both of these functions push the grace-period-start request up the rcu_node tree until either the request is found to have been previously recorded in the global srcu_gp_seq_needed counter (in which case the tree-walk is done) or until the top of the srcu_node tree is reached. In the latter case, the updater records its need for the future grace period s in the global srcu_gp_seq_needed counter. If there is no SRCU grace period currently in progress, a new one is started. If there is already an SRCU grace period in progress, that grace period will start another upon completion.

Applicant has envisioned a use case wherein an SRCU updater invokes call_srcu( ) but is then excessively delayed before calling either srcu_funnel_gp_start( ) or srcu_funnel_exp_start( ). In that situation, the call_srcu( ) function may see outdated grace period numbers due to wrapping of the global srcu_gp_seq counter. This could have the effect of producing SRCU grace periods that are either too long or too short. The former scenario may result in system hangs due to delayed freeing of memory while the latter scenario may result in data corruption due to premature memory freeing.

It would therefore be desirable to provide a Tree-SRCU mechanism that prevents the counter-wrap problem during update-side grace-period-start request operations.

SUMMARY

A method, system and computer program product provide an SRCU environment. The SRCU environment stores in a memory a set of per-processor data structures that each maintain a list of SRCU callbacks enqueued by SRCU updaters. The SRCU environment stores in the memory an SRCU management data structure that maintains a current-grace-period counter that tracks a current SRCU grace period, and a future-grace-period counter that tracks a farthest-in-the-future SRCU grace period needed by the SRCU callbacks enqueued by the SRCU updaters. The SRCU environment stores in the memory a combining tree for mediating a plurality of grace-period-start requests to update the future-grace-period record of the SRCU management data structure. Grace-period-start-request processing performed on behalf of an SRCU callback may include determining from the current-grace-period counter a future SRCU grace period needed by the SRCU callback. The grace-period-start-request processing may further include issuing a grace-period-start request on behalf of the SRCU callback to a leaf level of the combining tree that comprises plural leaf-level nodes, and propagating the grace-period-start request toward a single root node of the combining tree. The grace-period-start-request processing may further include updating the future-grace-period record of the SRCU management data structure as needed in response to the grace-period-start request reaching the root node of the combining tree. The grace-period-start-request-processing may further include updating the current-grace-period record of the SRCU management data structure to start a new SRCU grace period in response to the grace-period-start request reaching the root node of the combining tree if the SRCU grace period recorded in the future-grace-period record has not already completed and there is no SRCU grace period in progress. The grace-period-start-request processing may further include preventing a current-grace-period counter from wrapping during some or all of the grace-period-start request processing.

BRIEF DESCRIPTION OF THE DRAWINGS

The foregoing and other features and advantages will be apparent from the following more particular description of example embodiments, as illustrated in the accompanying Drawings.

DETAILED DESCRIPTION

Figure 1:
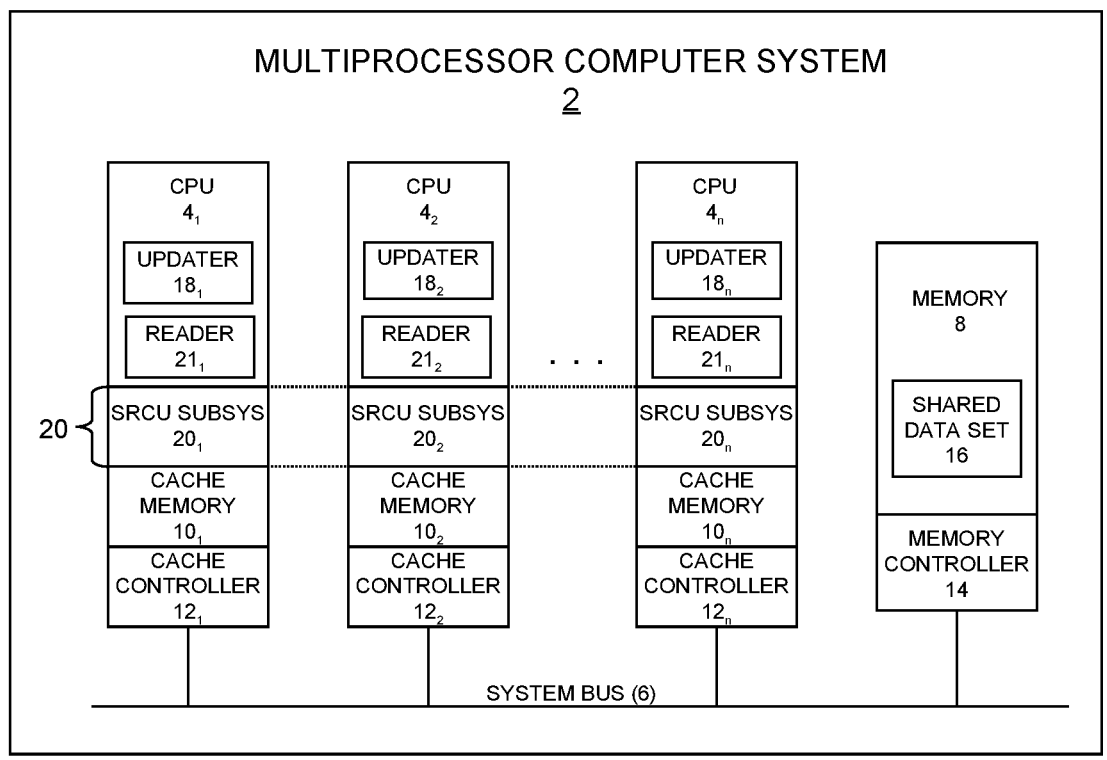
FIG. 1 is a functional block diagram showing a multiprocessor computer system that implements SRCU funnel locking in accordance with the present disclosure.

Turning now to the figures, wherein like reference numerals represent like elements in all of the several views, FIG. 1 illustrates an example multiprocessor computer system 2 in which a technique for using sleepable read-copy update (SRCU) to prevent counter wrap in tree-SRCU implementations may be practiced. The computer system 2 may include a plurality of processors $4_1, 4_2 \ldots 4_n$, a system bus 6, and a main program memory 8. There may also be cache memories $10_1, 10_2 \ldots 10_n$ and cache controllers $12_1, 12_2 \ldots 12_n$ respectively associated with the processors $4_1, 4_2 \ldots 4_n$. The cache memories 10 may be implemented in several levels (e.g., as level 1, level 2 and level 3 caches) and the cache controllers 12 may collectively represent the cache controller logic that supports each cache level. A memory controller 14 may be associated with the main memory 8. The memory controller 14 may be integrated with the processors 4 or could reside separately therefrom, for example, as part of a discrete chipset.

The computer system 2 may represent any of several different types of computing apparatus. Such computing apparatus may include, but are not limited to, general purpose computers, special purpose computers, portable computing devices, portable computing-communication devices (such as smartphones), media player devices, set-top devices, embedded systems, and many other types of information handling machines. The term "processor" as used with reference to the processors 4 encompasses any type of instruction execution device capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). The processors 4 may be situated within a single computing device or node (e.g., as part of a single-node SMP system) or they may be distributed over plural nodes (e.g., as part of a NUMA system, a cluster, or a cloud). The main memory 8 may be implemented using any suitable type of tangible storage medium capable of storing data in computer readable form for use in program execution, including but not limited to, any of various types of random access memory (RAM) (such as DRAM), various flavors of programmable read-only memory (PROM) (such as flash memory), and other types of primary storage (i.e., program memory). The cache memories 10 may likewise be implemented using any suitable type of primary storage, including but not limited to SRAM.

Each processor 4 is operable to execute program instruction logic under the control of program instructions stored in the main memory 8 (or elsewhere). As part of this program execution logic, SRCU update operations (updaters) 18 may execute within a process, thread, or other execution context (hereinafter "task") on any of the processors 4. Each SRCU updater 18 may run periodically to perform updates on a set of shared data 16 that may also be stored in the main memory 8 (or elsewhere). In FIG. 1, reference numerals $18_1, 18_2 \ldots 18_n$ illustrate individual SRCU updaters that respectively execute on the several processors $4_1, 4_2 \ldots 4_n$. The updates performed by an SRCU updater 18 can include modifying elements of a linked list, inserting new elements into the list, deleting elements from the list, and other types of operations. To facilitate such updates, the processors 4 may be programmed from instructions stored in the main memory 8 (or elsewhere) to implement a sleepable read-copy update (SRCU) subsystem 20 as part of their data processing functions. In FIG. 1, reference numbers $20_1, 20_2 \ldots 20_n$ represent individual SRCU subsystem instances that may respectively periodically execute on the several processors $4_1, 4_2 \ldots 4_n$. Operational details of the SRCU subsystem 20 are described below.

Any given processor 4 may also periodically execute SRCU read operations (readers) 21. Each SRCU reader 21 may run from program instructions stored in the main memory 8 (or elsewhere) in order to periodically perform read operations on the set of shared data 16 stored in the main memory (or elsewhere). In FIG. 1, reference numerals $21_1, 21_2 \ldots 21_n$ illustrate individual SRCU reader instances that may respectively execute on the several processors $4_1, 4_2 \ldots 4_n$. Such SRCU read operations will typically be performed far more often than SRCU updates, this being one of the premises underlying the use of read-copy update. Moreover, it is possible for several of the SRCU readers 21 to maintain simultaneous references to one of the shared data elements 16 while an SRCU updater 18 updates the same data element.

During operation of the computer system 2, an SRCU updater 18 may occasionally perform an update to one of the shared data elements 16. In accordance with the philosophy of SRCU, a first-phase update may be performed in a manner that temporarily preserves a pre-update view of the shared data element for the benefit of SRCU readers 21 that may be concurrently referencing the shared data element during the update operation. Following the first-phase update, the SRCU updater 18 may invoke the SRCU subsystem 20 to track an SRCU grace period for deferred destruction of the pre-update view of the data (second-phase update).

Figure 2:
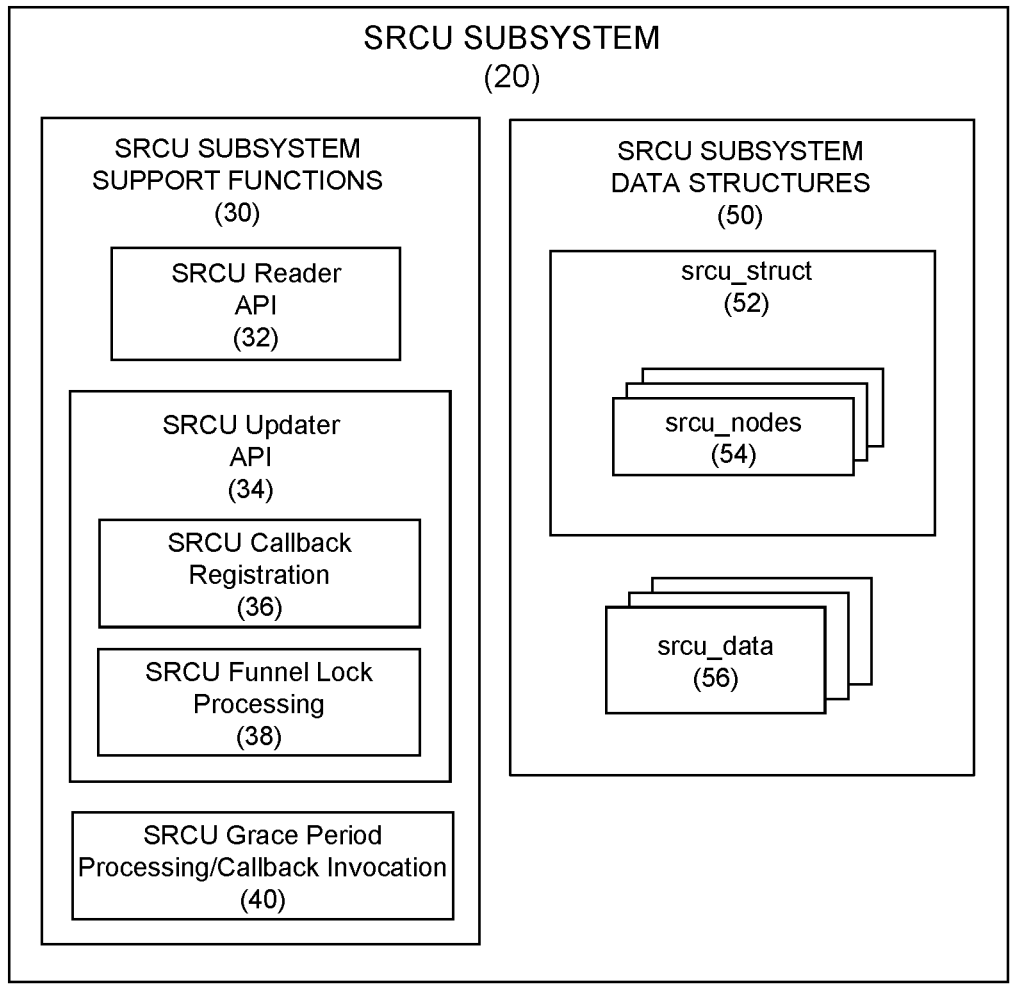
FIG. 2 is a functional block diagram showing an example SRCU subsystem that may be provided in the computer system of FIG. 1.

Turning now to FIG. 2, example components of the SRCU subsystem 20 are shown. Among these components is a set of SRCU subsystem support functions 30, namely, an SRCU reader API (Application Programming Interface) 32, an SRCU updater API 34, and SRCU grace period processing and callback invocation functionality 40.

The SRCU reader API 32 may include a reader registration component and a reader unregistration component that are respectively invoked by the SRCU readers 21 as they enter and leave their SRCU read-side critical sections to read shared data 16. In an example embodiment, the reader registration and unregistration components may be respectively implemented using modified versions of the srcu_read_lock( ) and srcu_read_unlock( ) primitives found in existing Linux® SRCU implementations.

The SRCU updater API 34 may include an SRCU callback registration component 36 and an SRCU funnel lock processing component 38. Example operations performed by these components in existing versions of the Linux® kernel are respectively described below in connection with FIGS. 4 and 5A-5B.

The SRCU grace period processing and callback invocation functionality 40 is responsible for managing SRCU grace periods and invoking SRCU callbacks whose grace periods have ended. Example operations that may be performed while implementing these functions are described in more detail below.

Figure 3:
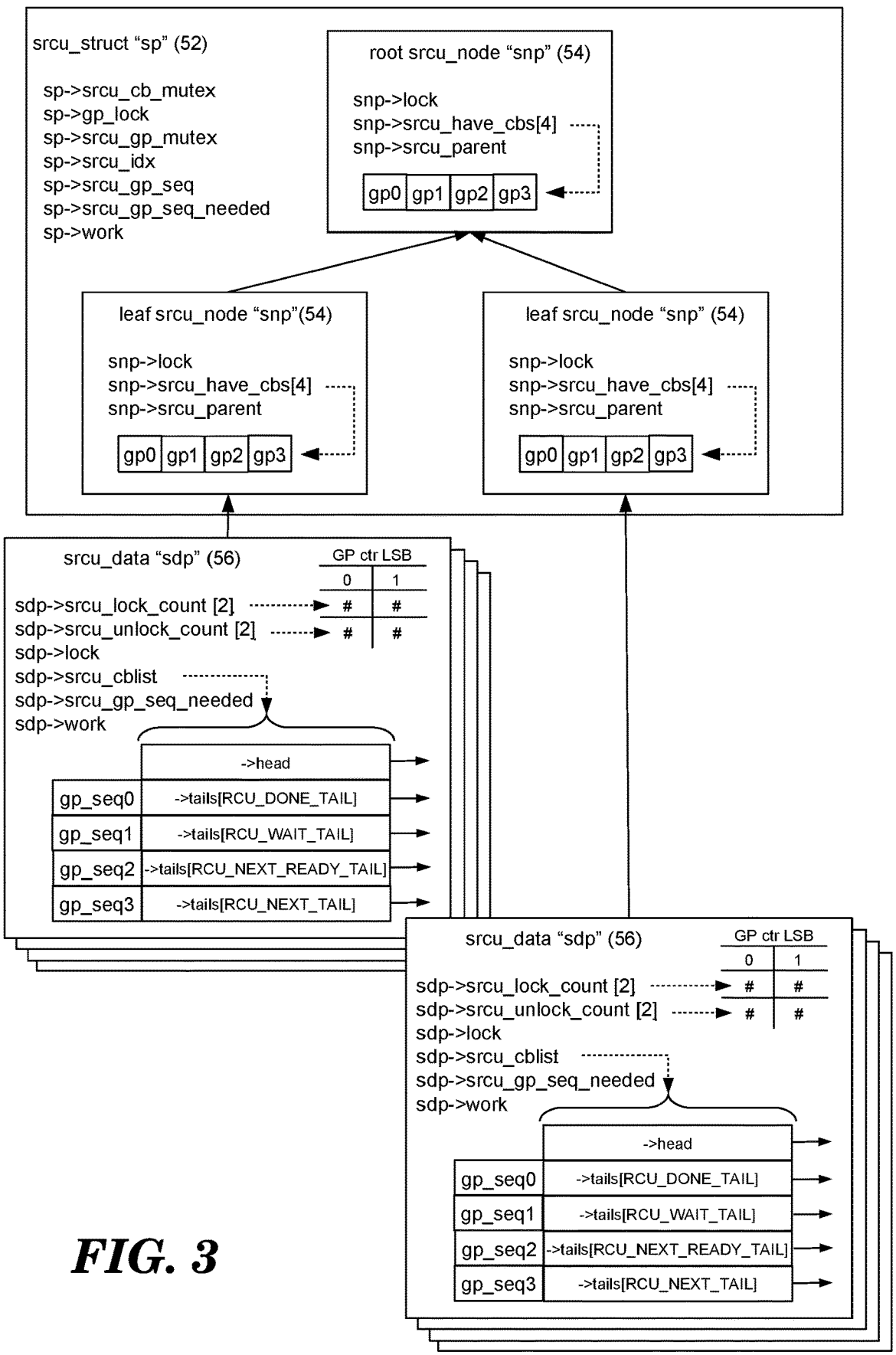
FIG. 3 is a functional block diagram showing example data structures that may be used by the SRCU subsystem of FIG. 2.

The SRCU subsystem 20 may further include a set of SRCU subsystem data structures 50. These data structures may include an srcu_struct structure 52, serving as an SRCU management data structure, and representing a modified version of the srcu_struct structure described in the Background section above. For ease of understanding, the srcu_struct structure 52 will be referred to as "sp" when describing the various fields (a.k.a. records) thereof. The srcu_struct structure 52 may have embedded therein (e.g., as a linear array) a combining tree of srcu_node structures 54. An example two-level tree of srcu_node structures 54 is shown in FIG. 3. By way of example only, the combining tree of FIG. 3 may include one root srcu_node structure 54 and two leaf srcu_node structures 54. Additional srcu_node levels may be provided as needed. For ease of understanding, the srcu_node structures 54 will be referred to as "snp" when describing the various fields (a.k.a. records) thereof (see below).

Each leaf srcu_node structure 54 has a set of a per-processor srcu_data structures 56 assigned to it. Each srcu_data structure 56 may represent one processor 4 in the computer system 2 and may be used to maintain SRCU-related information specific to that processor. For ease of understanding, the srcu_data structure 52 will be referred to as "sdp" when describing the various fields (a.k.a. records) thereof (see below).

Example fields of the srcu_struct structure 52, the srcu_node structures 54, and the srcu_data structures 56 will now be described in more detail with continued reference to FIG. 3. Turning first to the srcu_struct structure 52, the sp→srcu_cb_mutex field prevents later SRCU grace periods from getting ahead of previous SRCU grace periods during the initialization step for callback invocation. Acquisition of the sp→srcu_cb_mutex does not protect any data, but instead prevents more than one additional SRCU grace period from starting while the SRCU subsystem 20 is initiating callback invocation. This allows the snp→srcu_have_cbs[ ] array of the srcu_node structures 54 (see below) to have a finite number of elements. The sp→gp_lock field of the srcu_struct structure 52 protects the integrity of the sp→srcu_gp_seq and sp→srcu_gp_seq_needed fields (see below) of the srcu_struct structure. The sp→srcu_gp_mutex field of the srcu_struct structure 52 is used to serialize SRCU grace period processing work. The sp→srcu_idx field of the srcu_struct structure 52 is for use by the readers 21. It indicates the current active element of the sdp→srcu_lock_count[2] and sdp→srcu_unlock_count[2] arrays (see below) maintained by the srcu_data structures 56. These arrays are used by the readers 21 as they enter and leave their SRCU read-side critical sections.

The sp→srcu_gp_seq field of the srcu_struct structure 52 maintains a current grace period sequence number that indicates the grace period number and phase of the SRCU grace period that is currently in effect. The phase (e.g., grace period idle, grace period started, grace period ending) is indicated by the two low-order bits and the SRCU grace period number is represented by the remaining higher-order bits. The sp→srcu_gp_seq_needed field of the srcu_struct structure 52 records the SRCU grace period number of a furthest-in-the-future SRCU grace-period-start request that has propagated to the root of the srcu_node tree. The sp→work field of the srcu_struct structure 52 is used to schedule deferred callback invocation work by kernel workqueues.

As previously noted, the future SRCU grace period number s is calculated from the current SRCU grace period sequence number stored in the sp→srcu_gp_seq field of the srcu_struct structure 52. In an embodiment, s may have its two low-order bits cleared to 00, such that the grace period phase portion of the grace period sequence number is not utilized. Only the remaining high-order bits representing the actual SRCU grace period number will have meaning. In an embodiment, the sp→srcu_gp_seq_needed field of the srcu_struct structure 52 utilizes the same bit format.

Turning now to the rcu_node structures 54, the snp→lock field is used to serialize access to the rcu_node structure by the SRCU updaters 18. An snp→srcu_parent field contains a pointer to the rcu_node structure's parent node in the rcu_node tree. The snp→srcu_have_cbs[ ] array of each srcu_node structure 54 tracks the furthest-in-the-future grace period needed by any SRCU callback under the jurisdiction of that srcu_node structure. In an embodiment, the snp→srcu_have_cbs[ ] array has four elements that store different SRCU grace period numbers, thereby allowing requests for four different SRCU grace periods to be tracked concurrently while bounding contention. As noted above, the srcu_struct structure's sp→srcu_cb_mutex field, which prevents more than one additional grace period from starting while the SRCU subsystem 20 is initiating callback invocation, allows the snp→srcu_have_cbs[ ] array of the srcu_node structures 54 to have a finite number of elements.

In an embodiment, the grace period restrictions imposed by the rcu_struct structure's sp→srcu_cb_mutex field result in no more than three different SRCU grace periods needing to be tracked, such that the number of snp→srcu_have_cbs [ ] array elements actually required is three. However, using a four element array allows more efficient array index calculations. By way of example, the three array elements used for tracking different SRCU grace periods may respectively track a just-completed SRCU grace period (for srcu_data structures 56 having SRCU callbacks that are ready to be invoked), a current SRCU grace period (for srcu_data structures 56 having SRCU callbacks waiting on the current grace period), and a next SRCU grace period following the current one (for srcu_data structures 56 having SRCU callbacks waiting on the next grace period).

The SRCU grace period number stored in each snp→srcu_have_cbs[ ] array element may initially have the same bit format as the future SRCU grace period s; namely, the two low-order bits may be cleared to 00 and the remaining high-order bits may store the actual SRCU grace period number. In an embodiment, the bottom bit of each snp→srcu_have_cbs[ ] array element may serve as a grace-period-completion bit. This bit may remain in the cleared state while waiting for the array element's associated SRCU grace period to complete. The bit may be set to 1 once the associated SRCU grace period has completed in order to inform excessively delayed SRCU updaters that they must take responsibility for invoking the callbacks they enqueued. The setting of this bit may be handled by the SRCU grace period processing and callback invocation functionality 40 (FIG. 2). As previously mentioned, resolution of the race between SRCU callback posting and SRCU grace period completion (as determined from the grace-period-completion bit) may be handled at the leaf level of the srcu_node tree.

Turning now to the srcu_data structures 56, the sdp→srcu_lock_count[ ] array and the sdp→srcu_unlock_count[ ] array contain counters that are respectively incremented by the SRCU readers 21 as they enter and leave their SRCU read-side critical sections. Thus, the srcu_read_lock( ) primitive of the SRCU reader API 32 (FIG. 2) may be invoked by an SRCU reader 21 to increment one of the sdp→srcu_lock_count[ ] counters at the beginning of an SRCU read-side critical section. Similarly, the srcu_read_unlock( ) primitive of the SRCU reader API 32 (FIG. 2) may be invoked by an SRCU reader 21 to increment one of the sdp→srcu_unlock_count[ ] counters at the end of an SRCU read-side critical section. In FIG. 3, the value stored in the srcu_struct structure's sp→srcu_idx field determines which element of the sdp→srcu_unlock_count[ ] arrays is to be used during a given SRCU grace period.

The sdp→srcu_cblist field of each srcu_data structure 56 represents a per-processor SRCU callback list. The sdp→srcu_cblist field contains SRCU callbacks in association with the SRCU grace period numbers that determine when the callbacks may be invoked. The sdp→srcu_gp_seq_needed field of each srcu_data structure 56 records the farthest-in-the-future grace period requested for the processor 4 associated with the srcu_data structure. It may have the same bit format as the future SRCU grace period number s. The sdp→srcu_gp_seq_needed field reduces contention on the leaf srcu_node structures 54 insofar as an SRCU updater 18 will only traverse the srcu_node tree if a check of this field reveals that a future SRCU grace period needed by a newly-posted SRCU callback has not yet been requested. The sdp→work field of the srcu_data structures 56 provides a kernel workqueue context for invoking SRCU callbacks.

Figure 4:
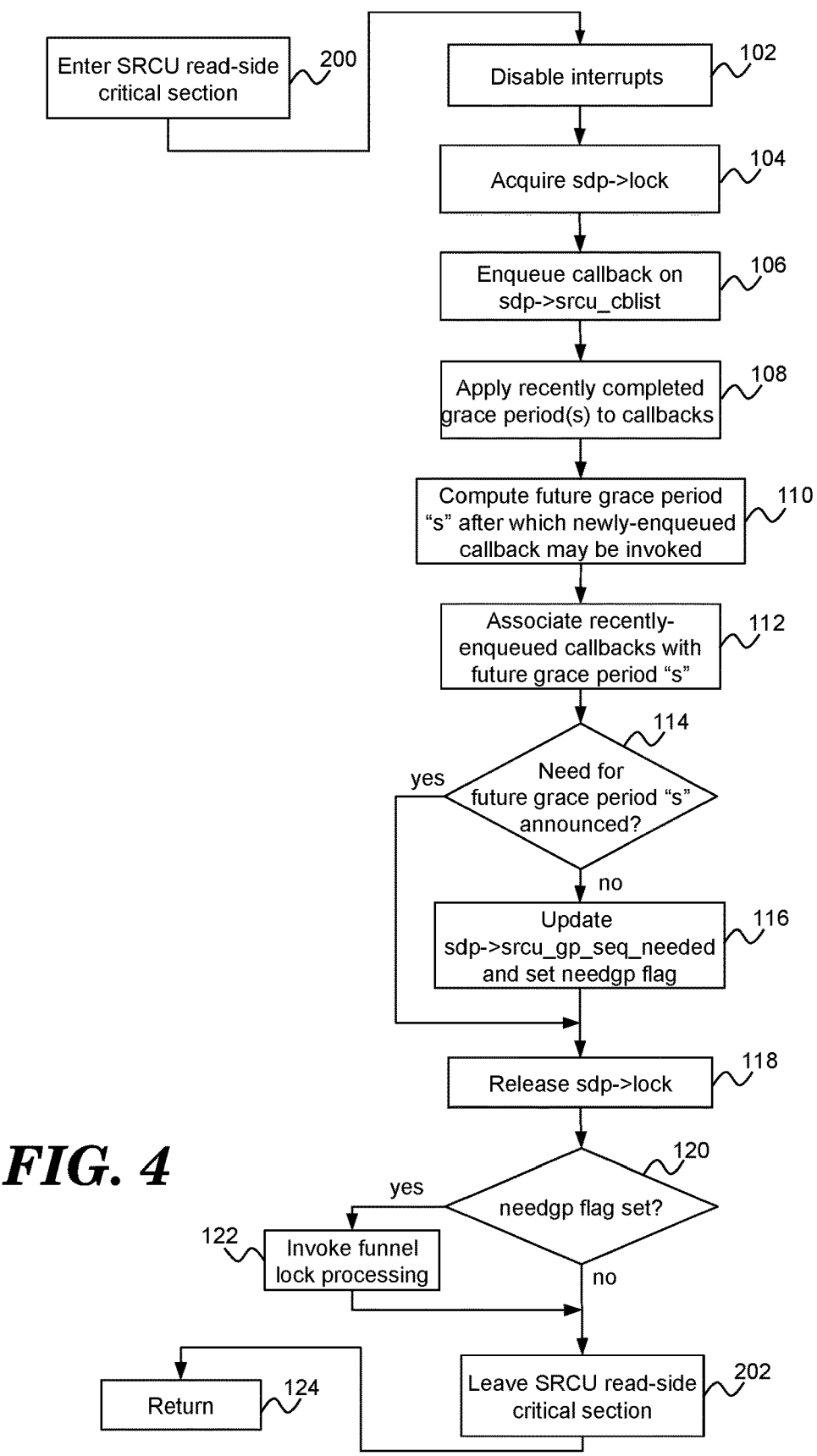
FIG. 4 is a flow diagram illustrating example SRCU callback registration processing that may be performed in accordance with an embodiment of the present disclosure.

Turning now to FIG. 4, example SRCU callback registration processing is shown that represents an embodiment of a first stage of SRCU grace-period-start-request processing according to the present disclosure. This first stage processing may represent operations of the SRCU callback registration component 36 (see FIG. 2), which may be invoked by the SRCU updaters 18 in order to register SRCU callbacks at srcu_data structures 56 associated with the processors 4 that run the updaters. It should be noted that the ensuing description of FIG. 4 temporarily omits a discussion of blocks 200 and 202. Instead, these blocks are discussed further below following the description of FIGS. 5A-5B.

Block 102 of FIG. 4 disables interrupts and block 104 acquires the srcu_data structure's sdp→lock. Block 106 enqueues a new SRCU callback at the end of the RCU_NEXT_TAIL portion of the srcu_data structure's SRCU callback list (sdp→srcu_cblist), updating the →tails[RCU_NEXT_TAIL] pointer as it does so. Block 108 advances callbacks on the srcu_data structure's SRCU callback list based on the current grace period sequence number stored in the srcu_struct structure's sp→srcu_gp_seq field. This operation may include finding all callbacks on the segmented SRCU callback list (sdp→srcu_cblist) whose →gp_seq numbers indicate they are ready to invoke, and putting them into the RCU DONE TAIL segment of the callback list.

Block 110 of FIG. 4 computes the future SRCU grace period number s that the newly-enqueued SRCU callback needs to complete in order for the callback to be invoked. In an embodiment, the future SRCU grace period number s computed in block 110 may be one or two grace periods beyond the current SRCU grace period number tracked by the srcu_struct structure's sp→srcu_gp_seq field. Block 112 associates any recently-enqueued callbacks on the srcu_data structure's SRCU callback list (→srcu_cblist) with the newly-computed future SRCU grace period number s, including the SRCU callback that was enqueued in block 106.

Block 114 of FIG. 4 compares the current value of the srcu_data structure's sdp→srcu_gp_needed field against the future SRCU grace period number s computed in block 110. If they are equal, it means that this srcu_data structure has previously announced its need for the future SRCU grace period represented by s. Processing may then bypass block 116 and proceed to block 118, which releases the srcu_data structure's sdp→lock. If, on the other hand, block 114 determines that the srcu_data structure has not previously announced its need for the future SRCU grace period represented by s, processing proceeds to block 116, which update's the srcu_data structure's sdp→srcu_gp_seq_needed field so that it stores s. This will prevent future redundant grace-period-start requests from being propagated up the rcu_node tree. Block 116 also sets a local flag, which may be named needgp. Following release of the srcu_data structure's sdp→lock in block 118, block 120 checks the local needgp flag. If it is set, block 122 invokes the SRCU funnel lock processing component 38 of FIG. 2. Otherwise, block 124 returns to the caller without invoking funnel lock processing.

Figure 5A:
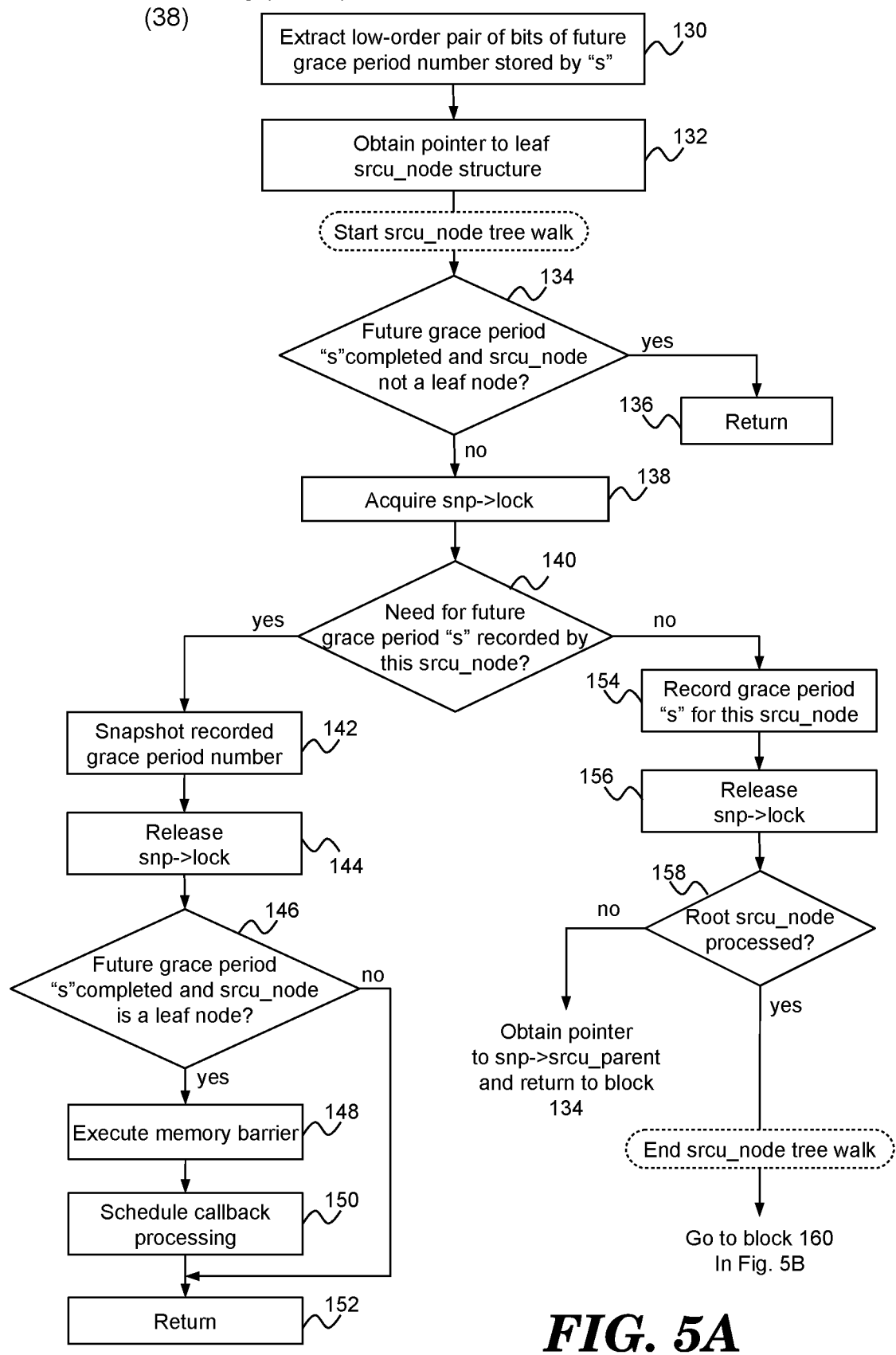
FIGS. 5A and 5B are a two-part flow diagram illustrating example funnel lock processing that may be performed in accordance with an embodiment of the present disclosure.
Figure 5B:
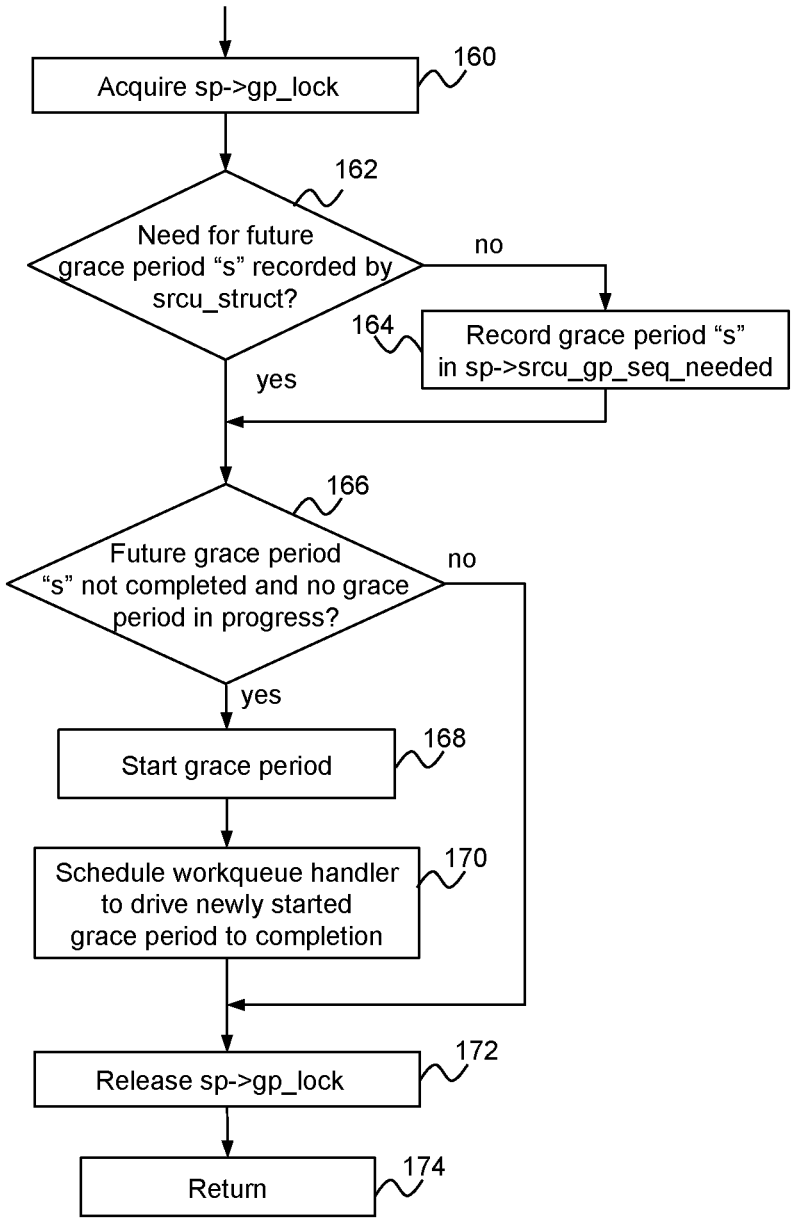

Turning now to FIGS. 5A and 5B, example SRCU funnel lock processing is shown that represents an embodiment of a second stage of SRCU grace-period-start-request processing according to the present disclosure. This second stage processing may represent operations of the SRCU funnel lock processing component 38 (see FIG. 2), which is invoked from block 122 of FIG. 4.

Block 130 of FIG. 5A extracts the low-order pair of bits of the future SRCU grace period number portion of s computed in block 110 of FIG. 4. Per the previous discussion of the bit format of s, the extracted bits will be the third and fourth low-order bits of the actual data field represented by s, the first and second low-order bits being unused and not part of the grace period number. Block 132 obtains a pointer to the leaf srcu_node structure 54 associated with the current srcu_data structure 56. A walk up the srcu_node tree is then performed by way of a loop that spans blocks 134-158 of FIG. 5A. It is desirable that the majority of srcu_node tree traversals terminate their walk at lower levels of the srcu_node tree in order to maintain an acceptable level of contention for the snp→lock of the various srcu_node structures. This is accomplished using the snp→srcu_have_cb[ ] arrays. As described in more detail below, only the first grace-period-start request for a given future SRCU grace period number s will proceed further up the tree. All later requests for the same grace period number will terminate their traversal.

Advantageously, by providing an array of snp→srcu_have_cb counters (i.e., four in the illustrated embodiment), concurrent grace-period-start requests for several different SRCU grace periods may be propagated concurrently up the srcu_node tree. As previously discussed, the number of different SRCU grace periods for which concurrent grace-period-start requests may be issued is constrained by the srcu_struct structure's sp→srcu_cb_mutex, allowing the snp→srcu_have_cbs[ ] array of the srcu_node structures 54 to have a finite number of elements tracking SRCU grace periods. For example, as earlier noted, three array elements of the snp→srcu_have_cbs[ ] array may be used to respectfully track grace-period-start requests for a just-completed SRCU grace period, a current SRCU grace period, and a next-following SRCU grace period.

Block 134 of FIG. 5A checks whether the future SRCU grace period represented by s has already completed. This may be handled by comparing s (as computed in block 110 of FIG. 4) against the current value of srcu_struct structure's sp→srcu_gp_seq field. If the future SRCU grace period indicated by s has completed, and if the current srcu_node structure 54 is not the leaf node, block 136 returns (i.e., to block 124 in FIG. 4). In that case, the need for a future SRCU grace period (and thus the presence of SRCU callbacks) will have been recorded on a leaf srcu_node structure 54 (i.e., per blocks 146-150 below), so the SRCU grace period processing and callback invocation functionality 40 (FIG. 2) will subsequently invoke the callbacks. Otherwise, execution continues to block 138 in order to acquire the snp→lock of this srcu_node structure 54.

Block 140 of FIG. 5A checks to see if a need for the future SRCU grace period represented by s has already been recorded on this srcu_node structure 54, in which case the srcu_node tree traversal is done. The foregoing check is handled using the bits extracted in block 130 as an index (idx) to the snp→srcu_have_cbs[ ] array, with the SRCU grace period number stored at this index position being compared to s. If the snp→srcu_have_cbs[idx] grace period number is greater than or equal to s, block 140 produces a "yes" result. In that case, processing proceeds to block 142, which takes a snapshot (snp_seq) of the SRCU grace period number stored by snp→srcu_have_cbs[idx]. Block 144 then releases the srcu_node structure's snp→lock. Block 146 checks to see if the future SRCU grace period represented by s has already completed. This may be handled by comparing s to the snapshot snp_seq of snp→srcu_have_cbs[idx] taken in block 142. Recalling that the SRCU grace period processing and callback invocation functionality 40 (FIG. 2) will set the bottom state bit of snp→srcu_have_cbs[idx] when the grace period number indicated by snp→srcu_have_cbs[idx] has completed, the check in block 146 will indicate whether the corresponding SRCU grace period has completed or is still in progress, even if the grace period numbers stored by s and snp_seq are the same.

If the SRCU grace period represented by s has completed, and if the srcu_node structure 54 is a leaf srcu_node structure, the SRCU grace period processing and callback invocation functionality 40 (FIG. 2) cannot be relied upon to invoke the srcu_data structure's SRCU callbacks in a timely fashion. In that case, block 148 executes a memory barrier to ensure that SRCU callback invocation occurs after the required SRCU grace period has completed, block 150 schedules SRCU callback invocation, and block 152 returns to the caller. If block 146 produces a "no" result, it means that the SRCU grace period represented by s has not yet completed, so the updater 18 can count on the SRCU grace period processing and callback invocation functionality 40 (FIG. 2) invoking the SRCU callbacks once the grace period does complete. In that case, block 152 simply returns to the caller.

Execution reaches block 154 of FIG. 5A if a need for the SRCU grace period represented by s has not yet been recorded for this srcu_node structure 54. Block 154 records s in the appropriate snp→srcu_have_cbs[idx] array element. Block 156 then releases the srcu_node structure's snp→lock, thus preparing for the next pass through the rcu_node tree traversal loop, beginning again at block 134 if block 158 indicates that the root srcu_node structure 54 has not yet been processed.

Assuming the srcu_node tree walk reaches the root srcu_node structure 54, and further assuming that this iteration of the s rcu_node tree walk loop results in blocks 154 and 156 being invoked, it means this is the first grace-period-start request for the SRCU grace period represented by s to reach the root of the srcu_node tree. Processing then proceeds from the "yes" branch of block 158 to block 160 in FIG. 5B, which acquires the srcu_struct structure's sp→gp_lock. Block 162 double-checks that this is the first grace-period-start request for the SRCU grace period represented by s by inspecting the srcu_struct structure's sp→srcu_gp_seq_needed field. If the sp→srcu_gp_seq_needed field stores a grace period number that is less than s, block 164 updates this field by recording s. Block 166 is reached following block 164, or if block 162 determines that the need for the SRCU grace period represented by s has been recorded by the srcu_state structure due to sp→srcu_gp_seq_needed being >=s. Block 166 checks if the SRCU grace period represented by s has not completed and there is no SRCU grace period in progress. If both conditions are satisfied, block 168 starts the requested SRCU grace period, block 170 utilizes the srcu_struct structure's sp→work field to schedule a kernel workqueue handler to drive the newly started grace period to completion, block 172 releases the srcu_struct structure's sp→gp_lock, and block 174 returns. If block 166 determines that either the SRCU grace period represented by s has completed or there is already an SRCU grace period in progress, blocks 168-172 are bypassed and block 174 simply returns. A successful return from block 174 guarantees that the SRCU callback enqueued in block 106 of FIG. 4 will be invoked in due course by the SRCU grace period processing and callback invocation functionality 40 of FIG. 2.

Returning now to FIG. 4, a use case may be envisioned wherein an SRCU updater invokes SRCU callback registration processing but is then excessively delayed before invoking funnel lock processing per FIGS. 5A-5B. In that situation, the SRCU callback registration processing may see outdated SRCU grace period numbers due to wrapping of the global sp→srcu_gp_seq counter. This could have the effect of producing SRCU grace periods that are either too long or too short. The former scenario may result in system hangs due to delayed freeing of memory while the latter scenario may result in data-corruption due to premature callback processing and resultant memory freeing.

Assume, for example, that the global sp→srcu_gp_seq counter is a 32-bit counter. The maximum counter value will be 0xffffffff (4,294,967,295). Recalling that the two low-order bits of the sp→srcu_gp_seq counter track SRCU grace period phase rather than SRCU grace period number, a new SRCU grace period will occur each time the counter is incremented by 4. When the SRCU grace periods occur, the least significant hex digit of the sp→srcu_gp_seq counter will be either 0x0, 0x4, 0x8 or 0xc. The future grace period number s will also have this format. The maximum number of SRCU grace periods that can be tracked by a 32-bit sp→srcu_gp_seq counter will be 0xffffffff/4=3fffffff (1,073,741,823), ranging from a counter value of 0x00000000 to a counter value of 0xfffffffc (4,294,967,292).

An example scenario that could result in system hangs due to delayed freeing of memory would be if block 110 of FIG. 4 computes a future grace period value s=0xfffffff8 (4,294,967,288) that is two SRCU grace periods after a current grace period value of 0xfffffff0 (4,294,967,280) stored in the global sp→srcu_gp_seq counter. Block 112 of FIG. 4 will associate recently-enqueued SRCU callbacks with the future SRCU grace period that corresponds to s=0xfffffff8 (4,294,967,288). Ordinarily, only two SRCU grace periods would need to elapse before the SRCU callbacks can be processed. However, assume that a processor 4 executing the call_srcu( ) function is delayed long enough for the global sp→srcu_gp_seq counter to wrap past the counter maximum of 0xffffffff and then up to 0x80000000 (2,147,483,648). In this scenario, the callbacks would not be processed for another 536,870,910 SRCU grace periods ((4,294,967,288−2,147,483,648)/4), when the future grace period number s=0xfffffff8 (4,294,967,288) is reached.

An example scenario that could result in premature callback processing and memory freeing would be would be if block 110 of FIG. 4 computes a future grace period value s=0x7ffffff0 (2,147,483,632) representing two SRCU grace periods after a current grace period value of 0x7fffffe8 (2,147,483,624) stored in the global sp→srcu_gp_seq counter. Block 112 will associate recently-enqueued SRCU callbacks with the future SRCU grace period that corresponds to s=0x7ffffff0 (2,147,483,632). Ordinarily, at least two SRCU grace periods would need to elapse before the callbacks can be processed. However, assume that a processor 4 executing the call_srcu( ) function is delayed long enough for the global sp→srcu_gp_seq counter to wrap past 0xffffffff (4,294,967,295) and then up to 0x7ffffff0 (2,147,483,632). In this scenario, the callbacks would be deemed to be ready for immediate processing even though there might be SRCU readers 21 still referencing the memory being freed.

The solution proposed herein is to prevent the global sp→srcu_gp_seq counter from wrapping during some or all of the processing of a grace-period-start request, i.e., during some or all of the operations of FIGS. 4 and 5A-5B.

In an embodiment, preventing wrapping of the sp→srcu_gp_seq counter may include preventing the sp→srcu_gp_seq counter from advancing until a selected point during processing of the grace-period-start-request has been reached.

In an embodiment, preventing wrapping of the sp→srcu_gp_seq counter may include initiating the grace-period-start request during a given SRCU grace period, and preventing the SRCU grace period from ending until a selected point during processing of the grace-period-start-request has been reached.

In an embodiment, preventing wrapping of the sp→srcu_gp_seq counter may include processing some or all of the grace-period-start request within an SRCU read-side critical section.

In an embodiment, preventing wrapping of the sp→srcu_gp_seq counter may include entering an SRCU read-side critical section prior to determining from the sp→srcu_gp_seq counter the future SRCU grace period needed by the SRCU callback. In the embodiment of FIGS. 4 and 5A-5B, this would be immediately prior to block 110 in FIG. 4.

In an embodiment, preventing wrapping of the sp→srcu_gp_seq counter may include leaving the SRCU read-side critical section after starting the new SRCU grace period. In the embodiment of FIGS. 4 and 5A-5B, this would be immediately following block 168 in FIG. 5B.

In an embodiment, preventing wrapping of the sp→srcu_gp_seq counter may include entering an SRCU read-side critical section at the start of grace-period-start request processing and exiting the SRCU read-side critical section at the end of grace-period-start request processing. This embodiment is illustrated by operations 200 and 202 in FIG. 4.

The approach taken in the embodiment of FIG. 4 is to have the SRCU updater 18 requesting SRCU callback registration procession enter an SRCU read-side critical section in block 200. This may be done using the srcu_read_lock( ) function provided by the SRCU reader API 34 of FIG. 2. As can be seen in FIG. 4, this action may be taken before block 110 picks up the current grace-period number in the global srcu_gp_seq counter and computes the future SRCU grace period represented by s. The SRCU updater 18 may then remain in the SRCU read-side critical section until completion of the funnel lock processing of FIGS. 5A and 5B, assuming block 120 of FIG. 4 determines that such processing needs to be invoked. The SRCU updater 18 may then, in block 202 of FIG. 4, invoke the srcu_read_unlock( ) function provided by the SRCU reader API 32 of FIG. 2 to exit its SRCU read-side critical section.

At most one SRCU grace period may complete during a corresponding SRCU read-side critical section. Therefore, wrapping of the global sp→srcu_gp_seq counter in a manner that can negatively affect operation of the SRCU subsystem 20 is no longer possible. This in turn ensures that the various counter comparisons performed during the funnel lock processing of FIGS. 5A-5B will produce correct results, thus avoiding the hangs and silent data corruption that might otherwise be caused by SRCU grace periods that are too short or too long.

Accordingly, a technique has been disclosed for preventing grace period counter wrap during update-side grace-period-request processing in a tree-based sleepable read-copy update (SRCU) environment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A computer-implemented method, comprising:
providing a sleepable-read-copy-update (SRCU) environment;
the SRCU environment storing in a memory a set of per-processor data structures that each maintain a list of SRCU callbacks enqueued by SRCU updaters of the SRCU environment;
the SRCU environment storing in the memory an SRCU management data structure that maintains a global current-grace-period counter that tracks a current SRCU grace period, and a future-grace-period counter that tracks a farthest-in-the-future SRCU grace period needed by the SRCU callbacks enqueued by the SRCU updaters;
the SRCU environment storing in the memory a combining tree for mediating a plurality of grace-period-start requests to update the future-grace-period record of the SRCU management data structure;
a processor performing grace-period-start-request processing on behalf of an SRCU callback, the grace-period-start-request processing comprising:
determining from the global current-grace-period counter of the SRCU management data structure a future SRCU grace period needed by the SRCU callback;
issuing a grace-period-start request on behalf of the SRCU callback to a leaf level of the combining tree that comprises plural leaf-level nodes, and propagating the grace-period-start request toward a single root node of the combining tree;
updating the future-grace-period record of the SRCU management data structure as needed in response to the grace-period-start request reaching the root node of the combining tree;
updating the current-grace-period record of the SRCU management data structure to start a new SRCU grace period in response to the grace-period-start request reaching the root node of the combining tree if the SRCU grace period recorded in the future-grace-period record has not already completed and there is no SRCU grace period in progress; and
avoiding delayed or premature freeing of memory related to the SRCU callback by preventing the global current-grace-period counter of the SRCU management data structure from wrapping past a counter maximum during some or all of the grace-period-start request processing.

2. The method of claim 1, wherein preventing wrapping of the global current-grace-period counter includes preventing the global current-grace-period counter from advancing until a selected point during the grace-period-start-request processing has been reached.

3. The method of claim 1, wherein preventing wrapping of the global current-grace-period counter includes initiating a grace-period-start request during an SRCU grace period and preventing the SRCU grace period from ending until a selected point in the grace-period-start-request processing has been reached.

4. The method of claim 1, wherein preventing wrapping of the global current-grace-period counter includes processing some or all of the grace-period-start request within an SRCU read-side critical section.

5. The method of claim 1, wherein preventing wrapping of the global current-grace-period counter includes entering an SRCU read-side critical section prior to determining from the current-grace-period counter the future SRCU grace period needed by the SRCU callback.

6. The method of claim 5, wherein preventing wrapping of the global current-grace-period counter includes leaving the SRCU read-side critical section after starting the new SRCU grace period.

7. The method of claim 1, wherein preventing wrapping of the global current-grace-period counter includes entering an SRCU read-side critical section at the start of grace-period-start request processing and exiting the SRCU read-side critical section at the end of grace-period-start request processing.

8. A system, comprising:
a plurality of processors;
a computer readable storage medium;
program instructions stored on the computer readable storage medium for execution by one or more of the processors to perform operations, the operations comprising:
providing a sleepable-read-copy-update (SRCU) environment;
the SRCU environment storing in a memory a set of per-processor data structures that each maintain a list of SRCU callbacks enqueued by SRCU updaters of the SRCU environment;
the SRCU environment storing in the memory an SRCU management data structure that maintains a global current-grace-period counter that tracks a current SRCU grace period, and a future-grace-period counter that tracks a farthest-in-the-future SRCU grace period needed by the SRCU callbacks enqueued by the SRCU updaters;
the SRCU environment storing in the memory a combining tree for mediating a plurality of grace-period-start requests update the future-grace-period record of the SRCU management data structure;
a processor performing grace-period-start-request processing on behalf of an SRCU callback, the grace-period-start-request processing comprising:
determining from the global current-grace-period counter of the SRCU management data structure a future SRCU grace period needed by the SRCU callback;
issuing a grace-period-start request on behalf of the SRCU callback to a leaf level of the combining tree that comprises plural leaf-level nodes, and propagating the grace-period-start request toward a single root node of the combining tree;
updating the future-grace-period record of the SRCU management data structure as needed in response to the grace-period-start request reaching the root node of the combining tree;
updating the current-grace-period record of the SRCU management data structure to start a new SRCU grace period in response to the grace-period-start request reaching the root node of the combining tree if the SRCU grace period recorded in the future-grace-period record has not already completed and there is no SRCU grace period in progress; and
avoiding delayed or premature freeing of memory related to the SRCU callback by preventing the global current-grace-period counter of the SRCU management data structure from wrapping past a counter maximum during some or all of the grace-period-start request processing.

9. The system of claim 8, wherein preventing wrapping of the global current-grace-period counter includes preventing the global current-grace-period counter from advancing until a selected point during the grace-period-start-request processing has been reached.

10. The system of claim 8, wherein preventing wrapping of the global current-grace-period counter includes initiating a grace-period-start request during an SRCU grace period and preventing the SRCU grace period from ending until a selected point in the grace-period-start-request processing has been reached.

11. The system of claim 8, wherein preventing wrapping of the global current-grace-period counter includes processing some or all of the grace-period-start request within an SRCU read-side critical section.

12. The system of claim 8, wherein preventing wrapping of the global current-grace-period counter includes entering an SRCU read-side critical section prior to determining from the global current-grace-period counter the future SRCU grace period needed by the SRCU callback.

13. The system of claim 12, wherein preventing wrapping of the global current-grace-period counter includes leaving the SRCU read-side critical section after starting the new SRCU grace period.

14. The method of claim 8, wherein preventing wrapping of the global current-grace-period counter includes entering an SRCU read-side critical section at the start of grace-period-start request processing and exiting the SRCU read-side critical section at the end of grace-period-start request processing.

15. A computer program product, comprising:
a computer readable storage medium;
program instructions stored on the computer readable storage medium for execution by a processor to perform operations, the operations comprising:
providing a sleepable-read-copy-update (SRCU) environment;
the SRCU environment storing in a memory a set of per-processor data structures that each maintain a list of SRCU callbacks enqueued by SRCU updaters of the SRCU environment;
the SRCU environment storing in the memory an SRCU management data structure that maintains a global current-grace-period counter that tracks a current SRCU grace period, and a future-grace-period counter that tracks a farthest-in-the-future SRCU grace period needed by the SRCU callbacks enqueued by the SRCU updaters;
the SRCU environment storing in the memory a combining tree for mediating a plurality of grace-period-start requests to update the future-grace-period record of the SRCU management data structure;
a processor performing grace-period-start-request processing on behalf of an SRCU callback, the grace-period-start-request processing comprising:
determining from the global current-grace-period counter of the SRCU management data structure a future SRCU grace period needed by the SRCU callback;
issuing a grace-period-start request on behalf of the SRCU callback to a leaf level of the combining tree that comprises plural leaf-level nodes, and propagating the grace-period-start request toward a single root node of the combining tree;
updating the future-grace-period record of the SRCU management data structure as needed in response to the grace-period-start request reaching the root node of the combining tree;
updating the current-grace-period record of the SRCU management data structure to start a new SRCU grace period in response to the grace-period-start request reaching the root node of the combining tree if the SRCU grace period recorded in the future-grace-period record has not already completed and there is no SRCU grace period in progress; and
avoiding delayed or premature freeing of memory related to the SRCU callback by preventing the global current-grace-period counter of the SRCU management data structure from wrapping past a counter maximum during some or all of the grace-period-start request processing.

16. The computer program product of claim 15, wherein preventing wrapping of the global current-grace-period counter includes preventing the global current-grace-period counter from advancing until a selected point during the grace-period-start-request processing has been reached.

17. The computer program product of claim 15, wherein preventing wrapping of the global current-grace-period counter includes initiating a grace-period-start request during an SRCU grace period and preventing the SRCU grace period from ending until a selected point in the grace-period-start-request processing has been reached.

18. The computer program product of claim 15, wherein preventing wrapping of the global current-grace-period counter includes processing some or all of the grace-period-start request within an SRCU read-side critical section.

19. The computer program product of claim 15, wherein preventing wrapping of the global current-grace-period counter includes entering an SRCU read-side critical section prior to determining from the global current-grace-period counter the future SRCU grace period needed by the SRCU callback, and leaving the SRCU read-side critical section after starting the new SRCU grace period.

20. The computer program product of claim 15, wherein preventing wrapping of the global current-grace-period counter includes entering an SRCU read-side critical section at the start of grace-period-start request processing and exiting the SRCU read-side critical section at the end of grace-period-start request processing.

* * * * *